Sept. 26, 1950
G. J. GOLUBICS
2,523,950
RUNNER ATTACHMENT FOR WHEELED VEHICLES
Filed Sept. 15, 1947
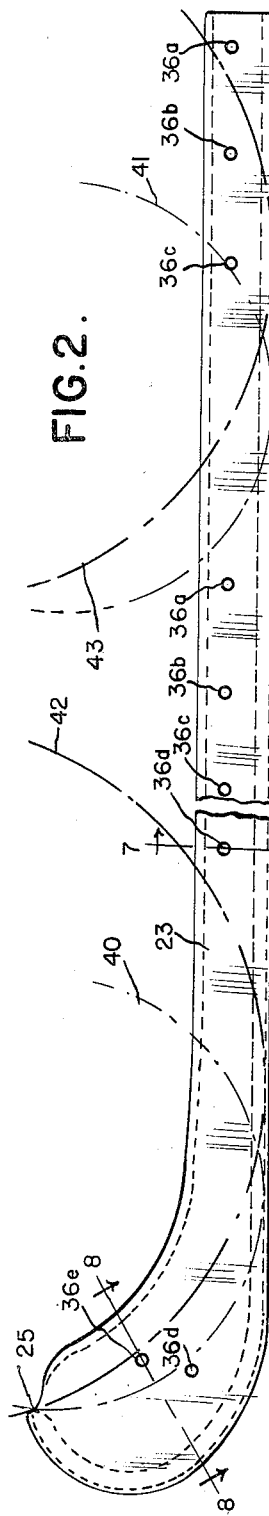
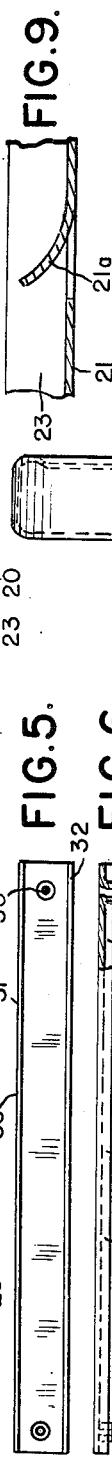
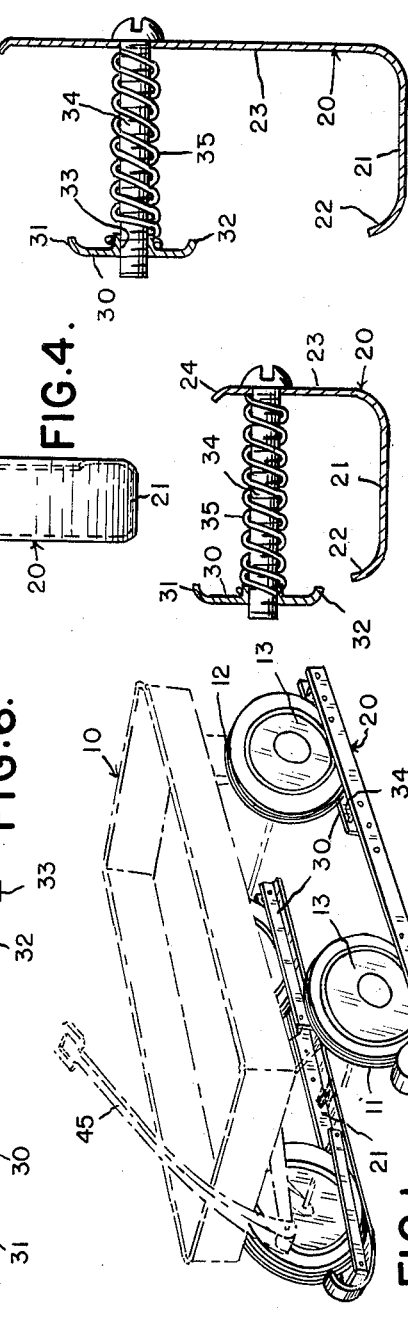
*INVENTOR.*
GEORGE J. GOLUBICS
BY
Whittemore, Hulbert
& Belknap
ATTORNEYS Patented Sept. 26, 1950

2,523,950

UNITED STATES PATENT OFFICE 2,523,950

RUNNER ATTACHMENT FOR WHEELED VEHICLES

George John Golubics, Detroit, Mich.

Application Sepember 15, 1947, Serial No. 774,047

7 Claims. (Cl. 280—13)

1

The present invention relates to a runner attachment for wheeled vehicles.

It is an object of the present invention to provide detachable runners for wheeled vehicles capable of being attached to vehicles of the solid wheel type.

It is a further object of the present invention to provide runner attachments for wheeled vehicles adaptable to fit vehicles having different sized wheels and different spacing between front and rear wheels.

It is a further object of the present invention to provide a runner attachment for steerable wheeled vehicles including means for clamping the runner to a front and rear wheel, respectively, the runner being transversely flexible to permit steering thereof.

Other objects and features of the invention will become apparent as the description proceeds, especially when taken in conjunction with the accompanying drawings, wherein:

Figure 1 is a perspective view of the runner attachments applied to a wagon;

Figure 2 is a side elevation of a runner attachment;

Figure 3 is a plan view of the runner attachment shown in Figure 2;

Figure 4 is a front elevation of the runner attachment shown in Figure 2;

Figure 5 is a side elevation of a clamping strip;

Figure 6 is a plan view of the clamping strip shown in Figure 5, with the parts in section;

Figure 7 is a section on the line 7—7 of Figure 2 on an enlarged scale;

Figure 8 is a section on the line 8—8 of Figure 2 on an enlarged scale; and

Figure 9 is a fragmentary longitudinal section showing a modified construction of runner.

Referring now to the figures, in Figure 1 there is illustrated a toy wagon 10 of the steerable type having front wheels 11 and rear wheels 12, the wheels being illustrated as of the solid or disk type. In other words, the wheels 11 and 12 are not provided with spokes but instead have solid disk portions 13.

Runner attachments indicated generally at 20 are applied to a corresponding front and rear wheel of the vehicle and are clamped thereto by releasable and adjustable clamping means later to be described.

The runner attachment is best seen in Figures 2 to 8 and comprises a flat runner portion 21 having one edge curved up slightly, as indicated at 22, and the opposite edge bent upwardly to provide a clamping and bracing flange 23, the upper edge of which is inwardly turned as indicated at 24 to provide a firm attachment to the wheel of the vehicle and preferably to a rubber tire thereof. The flange 23 is continuous and extends the full length of the runner 20. The runner portion 21 is curved upwardly and rearwardly, as indicated at 25 in Figure 2, and serves as an abutment and supporting means for the front wheel of the vehicle.

A pair of separate clamping strips 30 are provided, these being illustrated in detail in Figures 5, 6, 7 and 8. Each of these strips comprises an elongated metal member having its side edges bent inwardly as indicated at 31 and 32. Adjacent the ends of the strips are extruded, internally tapped openings 33 adapted to receive clamping screws 34. Obviously, instead of providing the tapped opening through the strip 30 the strip could be attached to the runner 20 by other means. The inwardly bent edges 31 and 32 of the strip 30 serve as stiffening means therefor and also as means for firmly engaging a wheel and preferably a rubber tire on the vehicle.

Surrounding the screws 34 and located intermediate the flange 23 and the clamping strip 30 are compression springs 35 which retain the clamping strips 30 spaced from the flange 23 the full limit permitted by the adjustment of the clamping screws 34. This facilitates attachment and detachment of the runner from the vehicle.

The elongated runner is provided with a plurality of pairs of screw-receiving openings 36a, 36b, 36c, 36d and an additional opening 36e adapted to cooperate with the innermost opening 36d, in order to accommodate the clamping strips 30 in different positions of adjustment. Thus, for example, in Figure 2 there is indicated in dotted lines at 40 and 41 a pair of relatively small, relatively closely spaced wheels. In this case the clamping strip 30 at the front of the runner 20 would be secured to the openings 36d in the flange 23 and the rearmost clamping strip would be secured to openings 36b therein. If, however, the larger wheels 42 and 43 are engaged by the runner, the front clamping strip would be secured to the flange 23 by means of the rearmost opening 36d and the opening 36e while the wheel at the rear of the vehicle would be clamped by a clamping strip supported from openings 36a in the flange 23.

The runner, being formed of sheet metal, has a certain amount of transverse flexibility, or in other words may be curved in a horizontal plane by the application of suitable forces thereto. Thus when the runner is attached to a steerable vehicle such as the wagon 10 illustrated in Figure 1, a steering force applied to the front wheels 11 through the medium of the handle 45 applies a bending moment to the runners 20 which will cause them to assume arcuate curvatures in horizontal planes, with the result that the vehicle may be steered in the usual manner. The amount of flexibility is not great and the device cannot be caused to take an abrupt turn but it is nevertheless effective to steer the device in a manner suitable for down hill coasting or the like.

The runner portion 21 may be discontinuous at a point between the wheel engaging part, in which case the forward end of the rear runner section is bent upwardly as indicated at 21a (Figure 9). In this case, transverse flexibility is increased, permitting steering of the vehicle.

It is desired to emphasize that the present runner may be attached to vehicles having solid wheels as opposed to those having openings in the wheels such as those provided by spokes. So far as I am aware, previous efforts to provide runners for wheeled vehicles have involved the use of attaching means which extended through openings in the wheels. By the present construction the necessity for this is completely avoided and a particularly advantageous clamping means is provided. Both the flange 23 and the clamping strip 30 have inwardly turned portions 24 and 31, respectively, which provide a firm grip or bite, particularly when the vehicle is provided with rubber wheels as is almost invariably the case.

The drawings and the foregoing specification constitute a description of the improved runner attachment for wheeled vehicles in such full, clear, concise and exact terms as to enable any person skilled in the art to practice the invention, the scope of which is indicated by the appended claims.

What I claim as my invention is:

1. A device for attachment to wheeled vehicles comprising a continuous, elongated metal member having means for clampingly engaging a front and rear wheel thereof, said member having a runner portion on which the wheels rest and a side flange portion against which the sides of the wheels are clamped, said runner portion being discontinuous between the wheel engaging parts thereof to provide for increased transverse flexibility, the forward end of the rear runner portion being upwardly curved.

2. A runner attachment for wheeled vehicles comprising a sheet metal runner having one edge bent up to form a side flange, the upper edge of said side flange being bent inwardly to form a tire engaging lip, a separate locking strip adapted to engage the side of the wheels opposite to said side flange, said strip having inturned lips at top and bottom to stiffen said strip and to engage the tires of the vehicle, and clamping means for connecting the ends of said strip to said side flange.

3. A runner attachment for wheeled vehicles comprising a sheet metal runner having one edge bent up to form a side flange, the upper edge of said side flange being bent inwardly to form a tire engaging lip, a separate locking strip adapted to engage the side of the wheels opposite to said side flange, said strip having inturned lips at top and bottom to stiffen said strip and to engage the tires of the vehicle, and clamping means for connecting the ends of said strip to said side flange, said clamping means comprising headed screws extending between said side flanges and said locking strip, one of said parts having openings for receiving said screws, and the other of said parts having threaded collars for receiving said screws.

4. A runner attachment for wheeled vehicles comprising a sheet metal runner having one edge bent up to form a side flange, the upper edge of said side flange being bent inwardly to form a tire engaging lip, a separate locking strip adapted to engage the side of the wheels opposite to said side flange, said strip having inturned lips at top and bottom to stiffen said strip and to engage the tires of the vehicle, and clamping means for connecting the ends of said strip to said side flange, said clamping means comprising headed screws extending between said side flanges and said locking strip, one of said parts having openings for receiving said screws, and the other of said parts having threaded collars for receiving said screws, and compression springs surrounding said screws and received between said side flange and said locking strip to separate them to the extent permitted by adjustment of said screws.

5. A runner attachment for wheeled vehicles comprising a sheet metal runner having one edge bent up to form a relatively wide side flange, the upper edge of said side flange being bent inwardly to form a tire engaging lip, the opposite edge of said runner being bent upwardly to provide a relatively narrow stiffening flange, a separate locking strip adapted to engage the side of the wheels opposite to said side flange, said strip having inturned lips at top and bottom to stiffen said strip and to engage the tires of the vehicle, and clamping means for connecting the ends of said strip to said side flange.

6. A runner attachment for wheeled vehicles comprising a runner having a flat bottom runner portion upwardly and rearwardly curved at its front end for engaging the front wheel of the vehicle, the edge of said runner being bent upwardly to form a side flange being wider at its front portion to join the reversely extending end of the runner portion, the upper edge of the side flange extending rearwardly and downwardly therefrom, separate locking strips for the front and rear vehicle wheels, means for securing the ends of said strips to said side flange to clamp the vehicle wheels therebetween, and vertically spaced openings in the widened portion of side flange adjacent the front end thereof for receiving said securing means to accommodate wheels of different diameter.

7. A runner attachment for wheeled vehicles comprising a runner having a flat bottom runner portion upwardly and rearwardly curved at its front end for engaging the front wheel of the vehicle, the edge of said runner being bent upwardly to form a side flange being wider at its front portion to form the reversely extending end of the runner portion, the upper edge of the side flange extending rearwardly and downwardly therefrom, the widened portion of said side flange being proportioned to overlie the side portion of the front wheel to reduce packing of snow therein, separate locking strips for the front and rear vehicle wheels, means for securing the ends of said strips to said side flange to clamp the vehicle wheels therebetween, and vertically spaced openings in the widened portion of side flange adjacent the front end thereof for receiving said securing means to accommodate wheels of different diameter.

GEORGE JOHN GOLUBICS.

(References on following page)

REFERENCES CITED

The following references are of record in the file of this patent:

UNITED STATES PATENTS

| Number | Name | Date |
|---|---|---|
| 821,974 | Allard | May 29, 1906 |
| 921,109 | Henle | May 11, 1909 |
| 970,874 | Beffel | Sept. 20, 1910 |
| 1,017,417 | Joy et al. | Feb. 13, 1912 |
| 1,068,120 | Fransson | July 22, 1913 |
| 1,076,816 | Carlson | Oct. 28, 1913 |

FOREIGN PATENTS

| Number | Country | Date |
|---|---|---|
| 9,807 | Norway | Aug. 12, 1901 |
| 36,461 | Austria | Mar. 10, 1909 |